//  "Patented Nov. 22, 1938"  "2,137,404"

UNITED STATES PATENT OFFICE

2,137,404

DRYING PROCESS

Hanns Hollerer, Munich, Germany, assignor to Dr. Alexander Wacker Gesellschaft für Elektrochemische Industrie, G. m. b. H., Munich, Bavaria, Germany No Drawing. Application January 13, 1937, Serial No. 120,409. In Germany January 20, 1936

3 Claims. (Cl. 34—24)

This invention relates to a drying process for removing water from various materials. It may constitute a step in the cleaning and degreasing of articles, preliminary to further treatment thereof, or in various other operations.

Generally, moving and preferably warm air or gases are utilized for drying objects moistened by water. In addition to the expensive apparatus necessitated, this method has been found to be disadvantageous because certain materials suffer under surface attacks or deformations or the like, as do metal or wood and the like. It has been proposed to avoid these difficulties by treating the objects moistened by water within a boiling volatile and water-insoluble fluid, or its vapor, with the generated vapors carrying away the water. However, this latter process requires a great amount of time because the treating fluid must always be completely freed of water in order that it may be used over for drying objects moistened by water.

The above objections to the known methods referred to are eliminated in the process of the present invention, in which drying is effected even when a water-containing and water-insoluble treating fluid is used. This is done by bringing material moistened by water, such as metals, pressed bodies, textile fibers, pulverized masses and the like, into contact with an organic water-insoluble volatile fluid which contains small amounts of an emulsion medium. Such fluids may be mainly organic solvents such as benzene and benzol as well as, preferably, the incombustible solvents such as trichlorethylene, perchlorethylene, carbon tetrachloride and the like. The emulsifying agent may be an alkali salt of a resin or fatty acid, a metal salt insoluble in water such as calcium-oleate or a similar compound, a sulphonation product of a fat or oil of mineral, animal or vegetable origin, or a sulphonation product of equal parts of hydrated castor oil and naphthaline or of a wetting agent used in the textile industry.

In utilizing the process of the present invention, the article is immersed in the boiling treating fluid, containing the emulsion medium, whereby the water is caused to pass from the article into the treating fluid. After the treatment, the article is substantially entirely free of water. It is of advantage to use the treating fluid in heated or boiling state. The adhering solvent readily evaporates, and the treated articles quickly dry, upon removal thereof from the solvent fluid. It is of further advantage to briskly agitate the solvent or to move the immersed articles, or both. The articles may be treated before or after immersion with a liquid or vaporized solvent, and the after-treatment bath may contain a greasing medium for the prevention of corrosion, such as petrolatum. In many cases, however, it is possible to add the greasing medium directly to the treating solvent fluid containing the emulsion medium.

Whenever the water content of the treating fluid becomes excessive, it loses its efficiency and it is then necessary to remove the contained or emulsified water in order to render the fluid again efficient. This may be accomplished, for instance, by permitting the fluid to set for an appropriate time until separation of the watery contents thereof occurs, and then drawing off or decanting the latter. From the separated portion, the water may be removed by distillation and the residue, consisting essentially of emulsion medium, may be returned to the treating fluid. The portion consisting of solvent may also be dewatered, in case it is not sufficiently free of water, by distillation, for instance, and then it may be used over again.

The process of the present invention is performed preferably in open or closed containers such as are used for degreasing metals, in which the generated vapors are condensed by cooling means. The condensate, after the water contained therein has been separated out, is returned to the treating container. It is of special advantage to use open containers having their lower sections filled with the boiling treating fluid and their upper sections cooled, in connection with the use of non-combustible solvents such as carbon hydrochlorides. This permits of the immersion in the treating fluid of the articles to be dried, without fear of vapors escaping into the work room, and, as soon as the fluid has absorbed the water, of transfer of the articles into the cooled section of the container, wherein the adhering organic fluid rapidly evaporates and condenses and the articles quickly dry. In such machines it is possible to collect at least a part of the condensate and to free the same of water and return it to the treating container. This results in the treating fluid remaining efficient for a great length of time before its water content rises to a point where it is no longer suitable for removing water from articles immersed therein.

Mechanical means such as conveyor chains, conveyor belts and the like are preferably used for the continuous delivery to the treating container of goods to be dried. The container may also be combined with other devices such as devices for cleaning, greasing, etc., to form a single unit, thus simplifying necessary equipment such as conveyor and heating installations.

Examples

1. A piece of pine wood weighing 22.140 g. and containing 34.8% water was immersed in 150 g. benzene (boiling point 100–140°), which contained 1.5 g. calcium-oleate and 1.5 g. tartaric acid, heated to 80°, while the benzene was agitated briskly, for ten (10) minutes. After removing the piece of wood and permitting the benzene to evaporate, the piece of wood contained but 21.9% of water.

An experiment executed in the absence of emulsion media, showed that the water content of the wood could be reduced only to 28.4% in the same time.

2. A strip of filtering paper weighing 4.073 g. and containing 54.3% of water was immersed in 150 g. benzol heated to 60°, containing about 2% of tartaric acid as an emulsifying agent, and shaken for 10 minutes. After its removal from the bath, the paper was rinsed in pure benzol and showed a water content of only 14.7% after the benzol had evaporated.

Without an emulsifying agent, the water content was reduced in the same time to only 43%.

3. A sheet of aluminum having a surface area of 54 cm$^2$, to which adhered 0.822 g. of water, was immersed in 800 g. boiling perchlorethylene containing 2% calcium-oleate. After 5 seconds, the sheet was removed, the adhering perchlorethylene evaporated quickly and the sheet did not show any water or other marks where the metal was attacked, after it was rinsed in pure perchlorethylene.

The same procedure was followed in the absence of an emulsion medium, whereafter the sheet showed small drops of water and spots at the places previously wetted by water.

4. A water-moistened pressed "Bakelite" body of 163 cm$^2$ surface area was immersed for a few seconds in 300 cc. boiling trichlorethylene containing 2% of sodium-oleate. The removed body dried immediately and was free of trichlorethylene and water.

Without an emulsifying agent, drying could not be effected even after long immersion in trichlorethylene.

5. A water wetted glass lens of 2.5 cm. diameter was immersed in 100 cc. of boiling solvent-naphtha containing 2% of oil-acid salt of triethanolamine and heated to 70° and agitated. After a few seconds the lens was removed, whereupon it dried immediately and was free of solvent and water. Since a fine film of the emulsifying agent remained upon the glass, the lens was held within the vapors of water-free solvent-naphtha so that the vapors were condensed upon the glass, thus cleansing the same. After its removal and after evaporation of the solvent-naphtha, the lens was perfectly clean.

An experiment without an emulsifying agent showed that the water adhering to the glass lens was not removed, even after considerable agitation.

6. 3.68 g. of cotton thread containing 56.8% water were immersed and agitated for 3 minutes in 100 cc. of boiling dichlorethylene containing 1% of tartaric acid. After removing the cotton and after evaporation of the dichlorethylene, the cotton thread did not contain any water at all.

With dichlorethylene, without an emulsifying agent, the water content was lowered in the same time to only 32%.

Such a process may also be applied to machines used commonly for chemical cleaning of textiles, this being of importance for the removal of water from the goods to be cleaned, before the chemical cleaning.

I claim:

1. The process of removing water from articles, which comprises providing a bath of a volatile organic water insoluble liquid containing an emulsifying agent effective for removing water from articles immersed in said bath, immersing the articles in said bath thereby removing water from them, and removing said articles from the bath and drying them.

2. The process of removing water from articles, which comprises providing a bath of a volatile organic water insoluble liquid containing an emulsifying agent effective for removing water from articles immersed in said bath, immersing the articles in said bath thereby removing water from them, and removing said articles from the bath and drying them by evaporation from the removed articles of the bath liquid adhering thereto.

3. The process of removing water from articles, which comprises providing a bath of a volatile organic water insoluble liquid containing an emulsifying agent effective for removing water from articles immersed in said bath, said bath also containing a greasing agent effective for forming a protective coating of grease upon articles immersed in said bath, immersing the articles in said bath thereby removing water from them while coating them with grease, and removing said articles from the bath and drying them while leaving them covered with a protective coating of grease.

HANNS HOLLERER.